(12) United States Patent
Renken et al.

(10) Patent No.: US 11,565,575 B2
(45) Date of Patent: Jan. 31, 2023

(54) AIR MANAGEMENT SYSTEM FOR CLIMATE CONTROL UNIT OF A TRANSPORT CLIMATE CONTROL SYSTEM

(71) Applicant: THERMO KING LLC, Minneapolis, MN (US)

(72) Inventors: David J. Renken, Prior Lake, MN (US); Tony Spetz, Afton, MN (US)

(73) Assignee: Thermo King LLC, Minneapolis, MN (US)

( * ) Notice: Subject to any disclaimer, the term of this patent is extended or adjusted under 35 U.S.C. 154(b) by 0 days.

(21) Appl. No.: 16/917,351

(22) Filed: Jun. 30, 2020

(65) Prior Publication Data

US 2021/0402853 A1 Dec. 30, 2021

(51) Int. Cl.
*B60H 1/32* (2006.01)
*B60H 1/00* (2006.01)

(52) U.S. Cl.
CPC ....... *B60H 1/3225* (2013.01); *B60H 1/00664* (2013.01); *B60H 1/00828* (2013.01); *B60H 1/00835* (2013.01); *B60H 1/3227* (2013.01); *B60H 2001/3277* (2013.01); *B60H 2001/3282* (2013.01)

(58) Field of Classification Search
CPC .............. B60H 1/3225; B60H 1/00664; B60H 1/00828; B60H 1/00835; B60H 2001/3277; B60H 2001/3282; F25B 2500/22; F25B 2500/221; F25B 2500/222
See application file for complete search history.

(56) References Cited

U.S. PATENT DOCUMENTS 6,658,871 B1 * 12/2003 Stein .................. B60H 1/00764
62/282
10,422,559 B2 * 9/2019 Hartfield ............... F25B 31/004
10,724,766 B2 * 7/2020 Suzuki ................... F24F 1/005
(Continued)

FOREIGN PATENT DOCUMENTS

DE 102013220369 4/2015
WO 2020/009776 1/2020
(Continued)

OTHER PUBLICATIONS

Extended European Search Report, issued in the corresponding European patent application No. 21182906.4, dated Nov. 23, 2021, 7 pages.

*Primary Examiner* — Marc E Norman
(74) *Attorney, Agent, or Firm* — Hamre, Schumann, Mueller & Larson, P.C.

(57) ABSTRACT

Technologies are provided for preventing a working fluid leak from pooling and thus diluting any leaked working fluid from air within a condenser and/or evaporator compartment of the CCU. This can include a computer-readable medium that stores executable instructions that, upon execution, prevent a working fluid leak from pooling within a climate-control unit (CCU) of a transport climate control system. This also includes detecting fulfillment of activation threshold conditions in connection with the CCU. Also, this includes activating a fan in at least one of a condenser unit and an evaporator unit included in the CCU to dilute leaked working fluid from air within the CCU. Further, this includes detecting fulfillment of de-activation threshold conditions and de-activation of an activated fan.

14 Claims, 5 Drawing Sheets

(56) References Cited

U.S. PATENT DOCUMENTS

| | | | |
|---|---|---|---|
| 11,079,149 B2* | 8/2021 | Papas | F25B 49/005 |
| 2012/0150353 A1 | 6/2012 | Bassa | |
| 2016/0363358 A1 | 12/2016 | Papas et al. | |
| 2018/0304719 A1 | 10/2018 | Shen et al. | |
| 2020/0263891 A1* | 8/2020 | Noor | F24F 11/65 |
| 2021/0001689 A1 | 1/2021 | Kondrk et al. | |
| 2021/0207831 A1* | 7/2021 | Lord | F24F 11/86 |
| 2021/0268875 A1* | 9/2021 | Weyna | B60H 1/00485 |
| 2021/0293460 A1* | 9/2021 | Uehara | F25D 29/006 |
| 2021/0318012 A1* | 10/2021 | Yamada | F24F 11/81 |

FOREIGN PATENT DOCUMENTS

| | | |
|---|---|---|
| WO | 2020/028321 | 2/2020 |
| WO | 2020/051314 | 3/2020 |
| WO | 2020/055633 | 3/2020 |
| WO | 2020/067654 | 4/2020 |
| WO | 2020/0236480 | 11/2020 |
| WO | 2021/046107 | 3/2021 |

\* cited by examiner

AIR MANAGEMENT SYSTEM FOR CLIMATE CONTROL UNIT OF A TRANSPORT CLIMATE CONTROL SYSTEM

FIELD

The embodiments disclosed herein relate substantially to a climate control unit (CCU) of a transport climate control system (TCCS). More particularly, the embodiments relate to preventing a working fluid leak from pooling and thus diluting any leaked working fluid from air within a condenser and/or evaporator compartment of the CCU.

BACKGROUND

A transport climate control system is generally used to control environmental condition(s) (e.g., temperature, humidity, air quality, and the like) within a climate controlled space of a transport unit (e.g., a truck, a container (such as a container on a flat car, an intermodal container, etc.), a box car, a semi-tractor, a bus, or other similar transport unit). The transport climate control system can include, for example, a transport refrigeration system (TRS) and/or a heating, ventilation and air conditioning (HVAC) system. The TRS can control environmental condition(s) within the climate controlled space to maintain cargo (e.g., produce, frozen foods, pharmaceuticals, etc.). The HVAC system can control environmental conditions(s) within the climate controlled space to provide passenger comfort for passengers travelling in the transport unit. In some transport units, the transport climate control system can be installed externally (e.g., on a rooftop of the transport unit, on a front wall of the transport unit, etc.).

The transport climate control system can include a climate control circuit with a compressor, a condenser, an expansion valve, and an evaporator. A working fluid can include a working fluid that can be compressed and expanded as it flows through the climate control circuit and can be used to heat and/or cool the particular space.

SUMMARY

The embodiments disclosed herein relate substantially to a climate control unit (CCU) of a transport climate control system (TCCS). More particularly, the embodiments relate to preventing a working fluid leak from pooling and thus diluting any leaked working fluid from air within a condenser and/or evaporator compartment of the CCU.

The embodiments described herein are directed to at least periodically exhausting air out of a condenser unit and/or an evaporator unit of a CCU, to avoid a potential working fluid leak from pooling, thus diluting any leaked working fluid from the air within the condenser unit and/or evaporator unit of the CCU.

In accordance with at least one embodiment, a computer-readable medium stores executable instructions that, upon execution, prevent a working fluid leak from pooling within a climate-control unit (CCU) of a transport climate control system. This includes detecting fulfillment of activation threshold conditions in connection with the CCU. This also includes activating a fan in at least one of a condenser unit and an evaporator unit included in the CCU to dilute leaked working fluid from air within the CCU. Also, this includes detecting fulfillment of de-activation threshold conditions. Further, this includes de-activating the activated fan.

In accordance with at least one other embodiment, a controller has a corresponding computer-readable medium that stores executable instructions that, upon execution, cause a working fluid leak to be diluted from air within a CCU of a transport unit. Components of the controller may include an activation detector to detect fulfillment of activation threshold conditions in connection with the CCU. This also includes an air controller to circulate the air in at least one of the condenser unit and the evaporator unit. Also, this includes a deactivation detector to detect fulfillment of de-activation threshold conditions, and deactivate the air controller.

DRAWINGS

References are made to the accompanying drawings that form a part of this disclosure and which illustrate embodiments described in this specification. Various changes and modifications will become apparent to those skilled in the art from the following detailed description. The use of the same reference numbers in different figures indicates similar or identical items.

DETAILED DESCRIPTION

Embodiments disclosed and recited in this disclosure relate substantially to a CCU of a TCCS. More particularly, the embodiments relate to preventing a working fluid leak from pooling and thus diluting any leaked working fluid from air within a condenser and/or evaporator compartment of the CCU.

A CCU, in accordance with the embodiments described and recited herein, may be configured to create optimal air flow from a condenser unit and an evaporator unit. The condenser unit and the evaporator unit may be divided by a bulkhead that provides structural support for various components of the CCU, such as an air filter, a fuel filter, an evaporator blower, condenser fan(s), an evaporator coil, condenser coil(s), etc. The embodiments described and recited herein are directed towards at least periodically exhausting air out of the condenser unit and/or the evaporator unit of the CCU, to avoid a potential working fluid leak from pooling, thus diluting any leaked working fluid from the air within the condenser unit and/or evaporator unit of the CCU.

In the following detailed description, reference is made to the accompanying drawings, which are included as a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as substantially described herein and illustrated in the drawings, may be arranged, substituted, combined, separated, and designed in a wide variety of different configurations, all of which are explicitly contemplated herein.

The embodiments disclosed and recited herein are directed towards at least periodically exhausting air out of a condenser unit and/or an evaporator unit of a CCU to avoid a potential working fluid leak from pooling so that any potential leak may be mitigated below a flammable concentration.

Figure 1:
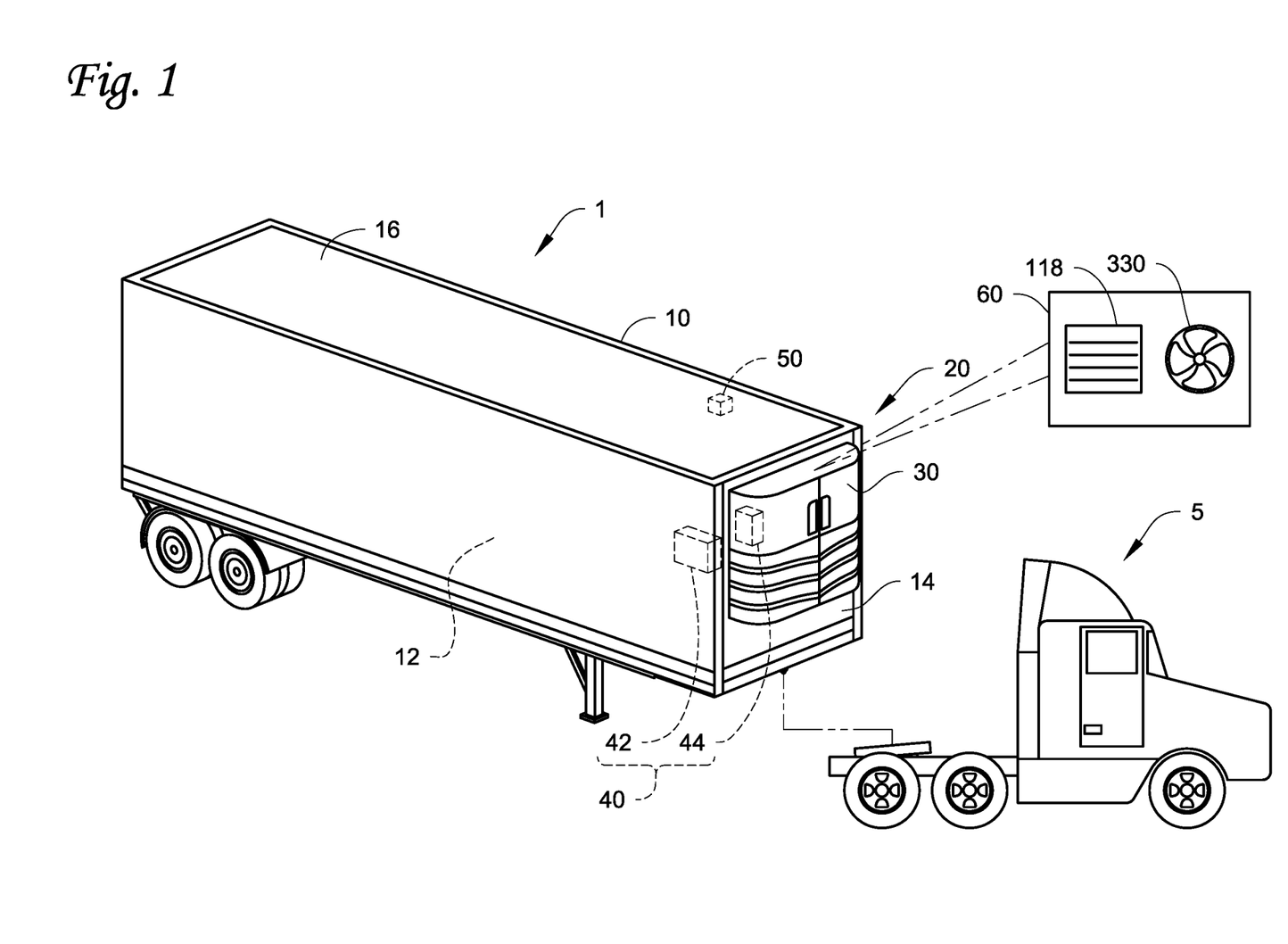
FIG. 1 shows a transport climate control system for a transport unit that is attached to a vehicle, in accordance with at least one embodiment described and/or recited herein.

FIG. 1 illustrates a TCCS 20 for a climate-controlled transport unit 1 that is attached to a tractor 5, in accordance with at least one embodiment described and/or recited herein. The climate-controlled transport unit 1 includes a transport unit 10 and the corresponding TCCS 20.

The transport unit 10 may be attached to tractor 5 that is configured to tow the transport unit 10, although transport unit 10 may alternatively be parked and detached from tractor 5. Note that the embodiments described herein are not limited to tractor and trailer units, but may apply to any type of transport unit such as e.g., a truck, a container (such as a container on a flat car, an intermodal container, etc.), a box car, a semi-tractor, a bus, or other similar transport unit.

The TCCS 20 includes a climate control unit (CCU) 30 that provides environmental control, e.g., temperature, humidity, air quality, etc., within a climate-controlled space 12 of transport unit 10.

The CCU 30 may provide conditioned air into the climate-controlled space 12, i.e., internal space, of the transport unit 10 to provide a desired conditioned environment for goods within. The desired conditioned environment for the climate-controlled space 12 may have one or more desired environmental conditions, e.g., temperature, humidity, air quality, etc., of the climate-controlled space 12. For example, the CCU 30 may provide cooled air to the climate-controlled space 12 when perishable goods are within the transport unit 10; additionally or alternatively, the CCU 30 may remove humidity from the air within the climate-controlled space 12 depending on needs of the goods within the transport unit 10, e.g., when electronics are within the transport unit 10.

The CCU 30 may be disposed on a front wall 14 of the transport unit 10; that is, on a side of the transport unit facing the forward direction as when climate-controlled transport unit 1 that is attached to a tractor 5. In one or more alternative embodiments, the CCU 30 may be disposed, for example, on a roof 14 or another wall of the transport unit 10.

The climate-controlled transport unit 1 may include at least one of a battery (not shown) or a prime mover (not shown) as a primary power source.

The TCCS 20 may be a hybrid power system that uses a combination of battery power and prime mover power or an electric power system that does not include or rely upon a prime mover of the TCCS 20 or the tractor 5 for power. The TCCS 20 may also include a programmable climate-controller 40 and one or more sensors 50. The one or more sensors 50 may be configured to measure one or more parameters of the climate-controlled transport unit 1, e.g., an ambient temperature and/or ambient humidity outside of the transport unit 10, a compressor suction pressure, a compressor discharge pressure, a temperature of air supplied into the climate-controlled space 12 by the CCU 30, a temperature of air returning from the climate-controlled space 12 to the CCU 30, humidity within the climate-controlled space 154, etc., and to communicate parameter data to the climate-controller 40. The climate-controller 40 may be configured to control operation of the TCCS 20, including components of the climate-control circuit. The climate-controller 40 may be a single integrated control unit 42 or a control unit formed by a distributed network of climate-controller elements 42, 44. The number of distributed control elements in a given network may depend upon the particular application of the principles described herein.

With regard to at least programmable climate-controller 40 and one or more sensors 50, dashed lines are shown in FIG. 1 to illustrate features that would not otherwise be visible in the view shown.

Figure 2:
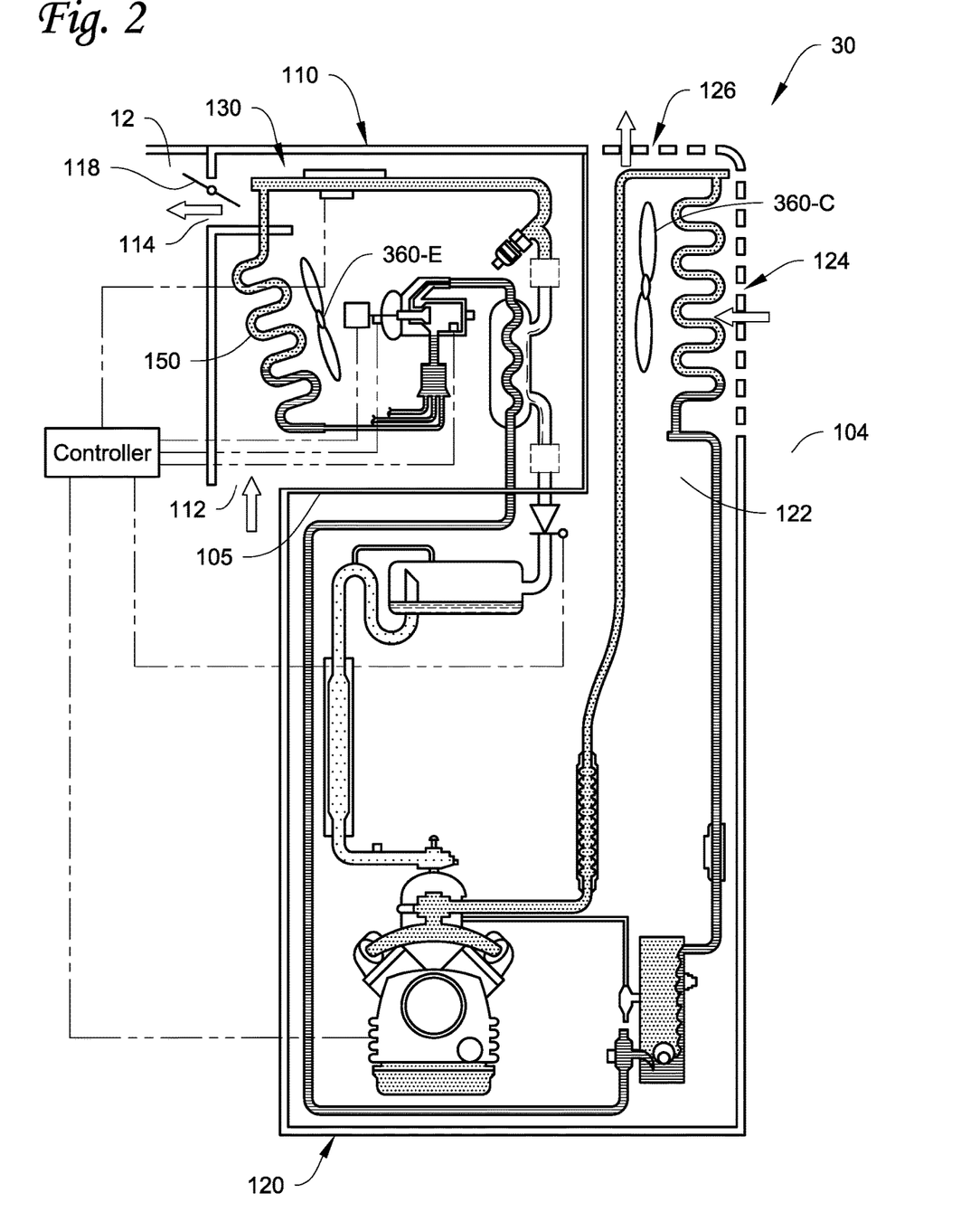
FIG. 2 shows a schematic diagram of an embodiment of a climate-controlled unit for a transport climate control system, in accordance with at least one non-limiting example embodiment described and/or recited herein.

FIG. 2 is a schematic diagram of an embodiment of a CCU 30 for a TCCS (e.g., the TCCS 20 shown in FIG. 1), in accordance with at least one non-limiting example embodiment described and/or recited herein.

The CCU 30 is utilized in a transport climate control system to condition a climate-controlled space 12. The CCU 30 includes a climate control circuit 130 that is configured and utilized to control one or more environmental conditions, e.g., temperature, humidity, air quality, etc., of the climate-controlled space 12. The CCU 30 includes, at least, an evaporator unit 110 and a condenser unit 120.

The evaporator unit 110 may include an evaporator air inlet 112, which alternatively be referred to as an air return inlet, and an evaporator air outlet 114. Air passes through the evaporator unit 110 by entering through the evaporator air inlet 112 and exiting through the evaporator air outlet 114. After air from the climate-controlled space 12 enters the evaporator unit 110 through the evaporator air inlet 112, the air is conditioned within the evaporator unit 110, i.e., heated or cooled; and the conditioned air is discharged from the evaporator unit 110 through the evaporator air outlet 114. In some embodiments, the evaporator unit 110 can include one or more evaporator blowers (not shown) that discharges conditioned air through the evaporator air outlet 114 and retrieves air from the climate-controlled space 12 through the evaporator air inlet 112. The conditioned air flows from the evaporator air outlet 114 to the climate-controlled space 12 to condition the climate-controlled space 12.

The condenser unit 120 may include an ambient air inlet 124 and an ambient air outlet 126. Ambient air from the external environment 104, e.g., ambient air from outside the climate-controlled transport unit 1, flows through the condenser unit 120 by entering through the ambient air inlet 124 and exiting through the ambient air outlet 126. In some embodiments, the condenser unit 120 can include one or more condenser fans 360C that push air out of the condenser unit 120 through the ambient air outlet 126.

Evaporator unit 110 may include a damper 118 that regulates the flow rate of the conditioned air from the condenser unit 120. The evaporator unit 110 may further include one or more fan 360E to control the flow of respective air therethrough. Further, the evaporator unit 110, in various embodiments, may include one or more of, each, damper 118 or blower 330 for exhausting air within the evaporator unit 110 to ambient (e.g., outside of the CCU 30); similarly, condenser unit 120, in various embodiments, may include one or more of, each, damper 118 or blower 330 for exhausting within the condenser unit 120 to ambient (e.g., outside of the CCU 30).

The CCU 30 may further include a bulkhead 105 that separates an internal volume 112 of the evaporator unit 110 from an internal volume 122 of the condenser unit 120. Accordingly, air and/or leaked gaseous working fluid within the condenser unit 120 may not flow into the evaporator unit 110 and also may not flow into the conditioned space climate-controlled space 12.

The climate-control circuit 130 may extend through the bulkhead 105. Pipes, hoses, etc., of the climate-control circuit 130 extend through the bulkhead 105 to direct the working fluid between the components of climate-control unit 130 located in the evaporator unit 110 and the components of the component of the climate-control unit 130 located in the condenser unit 120.

Figure 3:
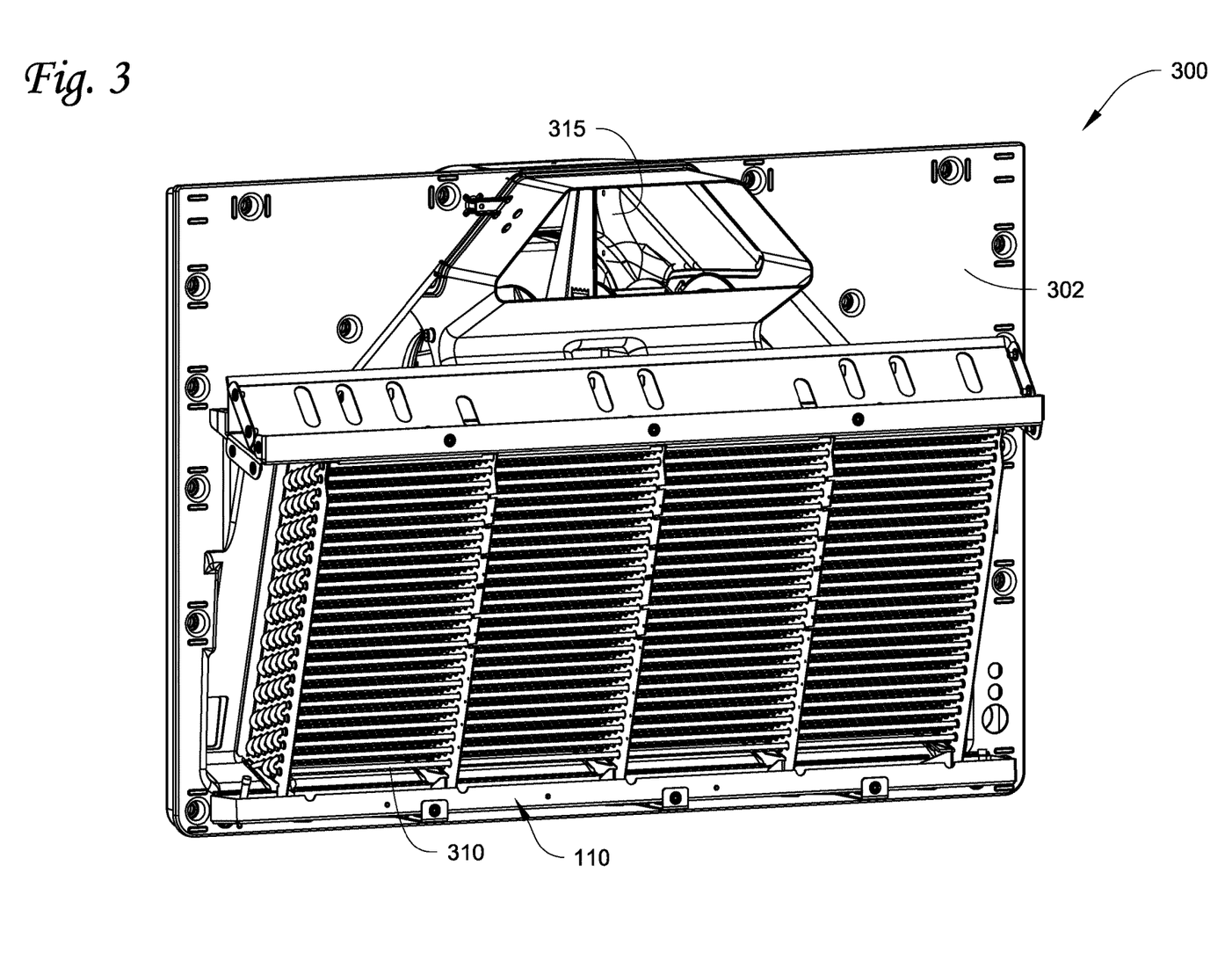
FIG. 3 shows a perspective view of an evaporator side of a bulkhead with an evaporator mounted on an inside surface of the bulkhead, in accordance with at least one non-limiting example embodiment described and/or recited herein.

FIG. 3 illustrates a perspective view of an inner side of a bulkhead 302 with an evaporator 110 mounted on an inside surface of the bulkhead 302, in accordance with at least one non-limiting example embodiment described and/or recited herein.

In accordance with at least one embodiment, evaporator unit 110 is disposed on the evaporator side of the bulkhead 302, and a condenser unit (not shown in FIG. 3) is disposed on the condenser side of the bulkhead 302. Both of evaporator unit 110 and condenser unit 120, as well as bulkhead 302, may be incorporated within at least a portion of exhaust 60 (FIG. 1).

Evaporator coil 310 receives air from the conditioned space, as blown by an evaporator blower (not shown). A warm airflow enters through the bulkhead 302 where the two-phase working fluid absorbs heat from air. The working fluid may be heated as it leaves the evaporator unit 110 and is routed back to the compressor unit 40 for recycling. Cooled air exiting the air outlet opening may be directed back into the conditioned space, where it will remove heat from the cargo and maintain the cargo at the desired temperature.

One or more embodiments of fan 360C, fans 360E, damper 118, and/or blower 330 may be disposed atop at least a portion of bulkhead 302 to provide an automated opening to regulate a rate of air amongst evaporator unit 110 and condenser unit 120.

Fans 360C and 360E may be automated to stir the air within the condenser unit 120 and evaporator unit 110, respectively. Further, both damper 118 and blower 330 may also be automated so that damper 118 intermittently opens and/or blower 330 intermittently turns on to dissipate any buildup of working fluid or other noxious or even toxic gases, e.g., working fluid, that may leak from either of evaporator unit 110 or condenser unit 120.

Accordingly, the non-limiting embodiments of fan 360C, fan 360E, damper 118, and/or blower 330 described and recited herein are designed and/or configured to reduce or even eliminate the risk that may be caused by leaks of working fluid from either of evaporator unit 110 or condenser unit 120, particularly as working fluids having flammable and/or toxic properties are utilized.

Controller 180 may be provided to, among other functions, regulate operations of various features and components of CCU 100 and corresponding components thereof, including climate-control circuit 130, which, in turn, may include damper 118 and blower 330.

In accordance with at least one embodiment described and recited herein, climate controller 180, which may be implemented, individually and/or collectively, by a range of hardware, software, firmware, or any combination thereof, may include a memory (not shown) for storing information and a processor (not shown). Further, climate controller 180 may be deployed as a single integrated control unit, as in FIG. 2. Alternatively, climate controller 180 may be deployed as a distributed network of climate controller elements.

Figure 4:
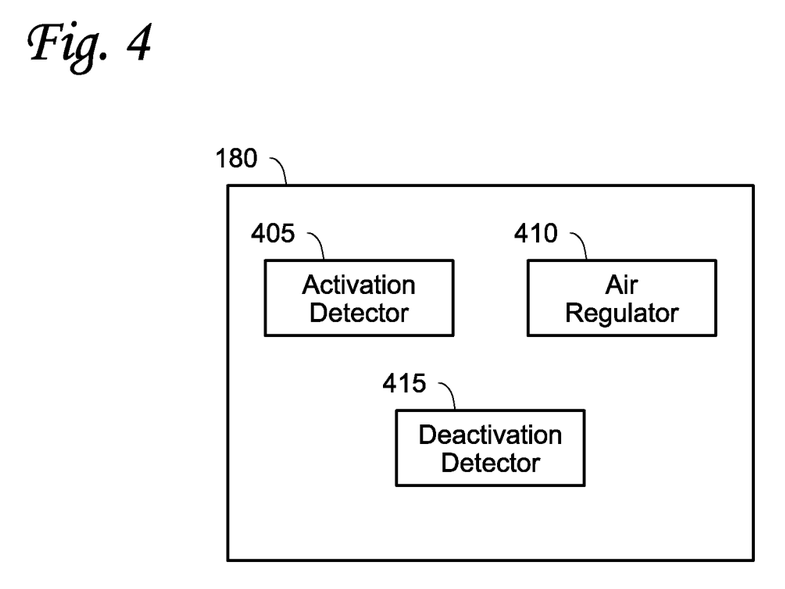
FIG. 4 shows a block diagram representing a controller for the transport climate control system, in accordance with at least one non-limiting example embodiment described and/or recited herein.

FIG. 4 shows a block diagram representing controller 180 corresponding to climate-control circuit 130, in accordance with at least one non-limiting example embodiment described and/or recited herein. As depicted, controller 180 includes at least activation detector 405, air controller 410, and deactivation detector 415. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

Activation detector 405 may refer to a component that is designed, programmed, or configured to detect fulfillment of activation threshold conditions in connection with the CCU 100. In accordance with at least one embodiment of the air management system described and/or recited herein, activation threshold conditions may include one or more of passage of a predetermined amount of time since the system was last utilized; in addition, or alternatively, the activation threshold conditions may include a detected volume of a leaked working fluid (e.g., refrigerant) within condenser unit 120 exceeding a predetermined volume.

For example, the predetermined amount of time may include a predetermined number of hours, e.g., six hours, since the blower in at least one of condenser unit 120 and evaporator unit 110 has been previously activated and/or a predetermined amount of time since a prime mover (e.g., an engine) or other primary power source (e.g., a battery source) for the transport unit was turned off. Accordingly, the embodiments described and/or recited herein may be implemented, among other times, overnight or on weekends so that a potential pooling of a leaked working fluid, e.g., A2L, may be dissipated.

Air controller 410 may refer to a component that is designed, programmed, or configured to provide instructions to electro-mechanically activate, i.e., open, damper 118 and/or blower 330 upon activation detector 405 detecting fulfillment of activation threshold conditions in connection with the CCU 100. Thus, by one non-limiting example, air controller 410 may activate one or both of damper 118 or blower 330 after activation detector 405 has determined that the predetermined amount of time has passed (e.g., six hours has passed) since either damper 118 or blower 330 had last been deactivated.

Air controller provides instructions to activate damper 118 and/or blower 330 independent of ignition of a prime mover or other primary power source of the transport unit.

Once activated by air controller 410, damper 118 and blower 330 may circulate air within evaporator unit 110 and/or exhaust air, including any leaked working fluid from condenser 120 unit to atmosphere through any ducts therein for a predetermined amount of time, e.g., 30 seconds.

Deactivation detector 415 may refer to a component that is designed, programmed, or configured to detect fulfillment of de-activation threshold conditions and, ultimately, to provide instructions to deactivate the air controller. In accordance with at least one embodiment of the air management system described and/or recited herein, deactivation threshold conditions may include one or more of passage of a predetermined amount of time, e.g., 30 seconds, since the system was activated; in addition, or alternatively, the deactivation threshold conditions may include a detected volume of a leaked working fluid within condenser unit 120 falling below a threshold volume.

Figure 5:
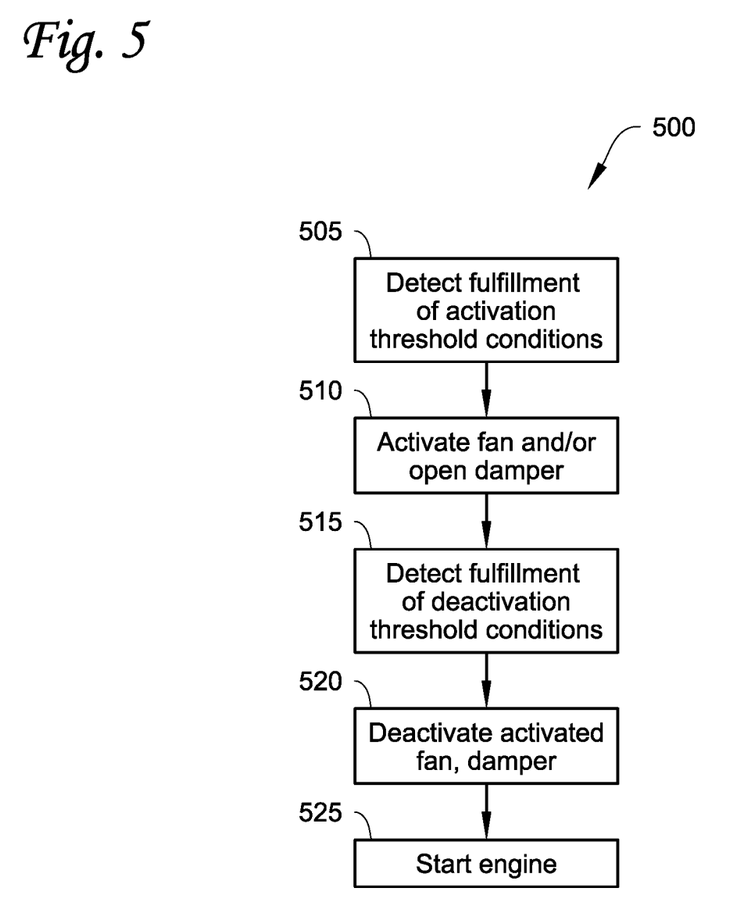
FIG. 5 shows a processing flow executed by a controller for a transport climate control system, in accordance with at least one non-limiting example embodiment described and/or recited herein.

FIG. 5 shows a processing flow executed by a controller for a climate-control circuit, in accordance with at least one non-limiting example embodiment described and/or recited herein.

As depicted, processing flow 500 includes sub-processes executed by various components of a controller 180 that may correspond to CCU 130. However, processing flow 500 is not limited to such components and processes, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 500 may include various operations, functions, or actions as illustrated by one or more of blocks 505, 510, 515, and 520. These various operations, functions, or actions may, for example, correspond to software, program code, or program instructions executable by a digital processor that causes the functions to be performed. Processing may begin at block 505.

At block 505 (Detect Fulfillment of Activation Threshold Conditions), activation detector 405 may detect fulfillment of activation threshold conditions in connection with the CCU. As set forth previously, the activation threshold conditions may include one or more of passage of a predetermined amount of time, detection of a predetermined volume of a working fluid within a condenser unit or evaporator unit.

For example, the predetermined amount of time may include a predetermined number of time which may be customized to be measured in minutes, hours, days, or even weeks, since the blower in condenser unit 120 and/or evaporator unit 110 has most recently been activated and/or a predetermined number of hours since a prime mover or other primary power source for the transport unit was turned off. Accordingly, the embodiments described and/or recited herein may be implemented, among other times, overnight or on weekends so that a potential pooling of a leaked working fluid, e.g., A2L, may be dissipated. Processing may proceed from block 505 to block 510.

At block 510 (Activate Fan and/or Open Damper), air controller 410 may provide instructions to electro-mechanically activate, i.e., open, damper 118 and/or blower 330 independent of ignition of a prime mover of the transport unit. The instructions for activation provided by air controller 410 may cause damper 118 to be open to exhaust air within either of condenser unit 120 and evaporation unit 110 and/or cause blower 330 to circulate air therein for a predetermined amount of time that may be measured in seconds, minutes, or even hours. The predetermined amount of time may be influenced by a non-limiting list of factors including but not exclusive of area of cargo area, type of working fluid used, frequency of ignition of transport unit. Processing may proceed from block 510 to block 515.

At block 515, (Detect Fulfillment of Deactivation Threshold Conditions, deactivation detector 415 may detect fulfillment of de-activation threshold conditions, which may include one or more of a passage of a predetermined amount of time since a damper 118 has been opened and/or a blower 330 has been on in in at least one of condenser unit 120 and evaporator unit 110 has on. In addition, or alternatively, the de-activation threshold conditions may include a detected volume of the working fluid within the condenser unit or the evaporator unit dropping below a acceptable threshold level. Processing may proceed from block 515 to block 520.

At block 520, air controller 410 may provide instructions to electro-mechanically close an open damper 118 or turn off an active blower 330 within condenser unit 120 and/or evaporator unit 110.

Block 525 (Start Engine) may refer to the engine of tractor 5 starting, optionally, when the aforementioned conditions have been met. Regardless of whether the fans turn off or as the engine start, the fresh air damper are to be closed.

Accordingly, safety in and around transport refrigeration units, in accordance with the embodiments described and recited herein, may be improved.

Aspects

It is to be appreciated that any of the following aspects may be combined:

Aspect 1. A computer-readable medium storing executable instructions that, upon execution, prevent a working fluid leak from pooling within a climate-control unit (CCU) of a transport climate control system by performing functions comprising:
detect fulfillment of activation threshold conditions in connection with the CCU;
activate a fan in at least one of a condenser unit and an evaporator unit included in the CCU to dilute leaked working fluid from air within the CCU;
detect fulfillment of de-activation threshold conditions; and
de-activate the activated fan.

Aspect 2. The computer-readable medium of Aspect 1, wherein the activation threshold conditions include one or more of passage of a predetermined amount of time, detection of a predetermined volume of a working fluid within a condenser unit or evaporator unit of the CCU.

Aspect 3. The computer-readable medium of Aspect 2, wherein the predetermined amount of time includes a predetermined number of hours since the fan in at least one of the condenser unit and the evaporator unit has been previously activated.

Aspect 4. The computer-readable medium of any one of Aspects 2 or 3, wherein the predetermined amount of time includes a predetermined number of hours since a primary power source for the transport unit was turned off.

Aspect 5. The computer-readable medium of any one of Aspects 2-4, wherein the working fluid includes A2L.

Aspect 6. The computer-readable medium of any one of Aspects 1-5, wherein the de-activation threshold conditions include one or more of a passage of a predetermined amount of time since the fan in in at least one of the condenser unit and the evaporator unit has been activated.

Aspect 7. The computer-readable medium of any one of Aspects 1-6, wherein the de-activation threshold conditions include a detected volume of the working fluid within the condenser unit or the evaporator unit dropping below a threshold level.

Aspect 8. The computer-readable medium of any one of Aspects 1-7, wherein the instruction to activate the fan in at least one of the condenser unit and the evaporator unit is independent of ignition of a primary power source of the transport unit.

Aspect 9. The computer-readable medium of any one of Aspects 1-8, wherein the activated fan in the condenser unit exhausts air from the condenser unit to atmosphere.

Aspect 10. The computer-readable medium of any one of Aspects 1-9, wherein the activated fan in the evaporator unit circulates air within the evaporator unit.

Aspect 11. A controller having a corresponding computer-readable medium that stores executable instructions that, upon execution, cause a working fluid leak to be diluted from air within a climate-control unit (CCU) of a transport unit, the controller having components comprising:
   an activation detector to detect fulfillment of activation threshold conditions in connection with the CCU;
   an air controller to circulate the air in at least one of the condenser unit and the evaporator unit;
   a deactivation detector to:
      detect fulfillment of de-activation threshold conditions, and
      deactivate the air controller.

Aspect 12. The controller of Aspect 11, wherein the activation threshold conditions include one or more of passage of a predetermined amount of time, detection of a predetermined volume of a working fluid within a condenser unit or evaporator unit of the CCU.

Aspect 13. The controller of Aspect 12, wherein the predetermined amount of time includes a predetermined number of hours since the fan in at least one of the condenser unit and the evaporator unit has been previously activated.

Aspect 14. The controller of any one of Aspects 12 or 13, wherein the predetermined amount of time includes a predetermined number of hours since a primary power source for the transport unit was turned off.

Aspect 15. The controller of any one of Aspects 12-14, wherein the working fluid includes A2L.

Aspect 16. The controller of any one of Aspects 11-15, wherein the air controller includes a fan in at least one of a condenser unit and an evaporator unit included in the CCU.

Aspect 17. The controller of Aspect 16, wherein the fan in either of the condenser unit and the evaporator unit is to be activated, independent of ignition of a primary power source for the CCU, until a detected volume of a gas within either of the condenser unit or the evaporator unit drops below a threshold level.

Aspect 18. The controller of any one of Aspects 16 or 17, wherein the fan in either of the condenser unit and the evaporator unit is to be activated, independent of ignition of a primary power source for the CCU, until a predetermined amount of time has elapsed.

Aspect 19. The controller of any one of Aspects 11-18, wherein the air controller includes a damper door corresponding to an evaporator unit included in the CCU.

Aspect 20. The controller of claim 19, wherein the damper door is to be opened, independent of ignition of a primary power source for the CCU, until a detected volume of a gas within either of the condenser unit or the evaporator unit drops below a threshold level.

Aspect 21. The controller of claim 19, wherein the damper door is to be opened, independent of ignition of a primary power source for the CCU, until a predetermined amount of time has elapsed.

The terminology used in this specification is intended to describe particular embodiments and is not intended to be limiting. The terms "a," "an," and "the," or even the absence of such modifiers, may refer to the plural forms as well, unless clearly indicated otherwise. The terms "includes," "including," "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

The invention claimed is:

1. A computer-readable medium storing executable instructions that, upon execution, prevent a working fluid from pooling within a climate-control unit (CCU) of a transport climate control system configured to provide climate control to an internal space of a transport unit by performing functions comprising:
   detect fulfillment of a single activation threshold condition from a plurality of activation threshold conditions, wherein one of the plurality of activation threshold conditions is a passage of a predetermined amount of time since a primary power source for the transport unit was turned off;
   activate, in response to fulfillment of the single activation threshold condition, at least one of a damper or a blower to stir working fluid from within the CCU;
   detect fulfillment of a single de-activation threshold condition from a plurality of de-activation threshold conditions, wherein one of the plurality of de-activation threshold conditions is a passage of a predetermined amount of time since at least one of the damper or the blower was activated; and
   de-activate at least the activated damper or blower.

2. The computer-readable medium of claim 1, wherein the plurality of activation threshold conditions includes passage of a predetermined amount of time since activation of the at least one of the damper or blower in at least one of the condenser unit or the evaporator unit.

3. The computer-readable medium of claim 2, wherein the predetermined amount of time includes a predetermined number of hours since the damper or the blower in at least one of the condenser unit or the evaporator unit has been previously activated.

4. The computer-readable medium of claim 2, wherein the predetermined amount of time includes a predetermined number of hours since the primary power source for the transport unit was turned off.

5. The computer-readable medium of claim 2, wherein the working fluid includes A2L.

6. The computer-readable medium of claim 1, wherein the function to activate at least one of the damper or the blower includes at least one of activating the damper to open to exhaust air within either of a condenser unit or evaporation unit or activating the blower to circulate air.

7. The computer-readable medium of claim 1, wherein the function to de-activate at least one of the damper or the blower includes at least one of closing the damper or de-activating the blower.

8. A controller having a corresponding computer-readable medium that stores executable instructions that, upon execution, cause a working fluid to be diluted from air within a climate-control unit (CCU) of a transport unit, the controller having components comprising:
   an activation detector to detect fulfillment of a single activation threshold condition from a plurality of activation threshold conditions, wherein one of the plurality of activation threshold conditions is a passage of a predetermined amount of time since a primary power source for the transport unit was turned off;
   an air controller to:
      activate, in response to fulfillment of the single activation threshold condition, at least at least one of a damper or a blower to circulate working fluid from the air in at least one of the condenser unit or the evaporator unit; and
   a deactivation detector to:
      detect fulfillment of a single de-activation threshold condition from a plurality of de-activation threshold conditions, wherein one of the plurality of de-activation threshold conditions is a passage of a predetermined amount of time since at least one of the damper or the blower was activated, and
      deactivate the at least one activated damper or blower.

9. The controller of claim 8, wherein the plurality of activation threshold conditions includes passage of a predetermined amount of time since activation of the at least one of the damper or blower in at least one of the condenser unit or the evaporator unit.

10. The controller of claim 9, wherein the predetermined amount of time includes a predetermined number of hours since the damper or the blower in at least one of the condenser unit or the evaporator unit has been previously activated.

11. The controller of claim 9, wherein the predetermined amount of time includes a predetermined number of hours since the primary power source for the transport unit was turned off.

12. The controller of claim 9, wherein the working fluid includes A2L.

13. The controller of claim 8, wherein the air controller is configured to de-activate the at least activated damper or blower by closing the damper or de-activating the blower.

14. A computer-readable medium storing executable instructions that, upon execution, prevent a working fluid from pooling within a climate-control unit (CCU) of a transport climate control system configured to provide climate control to an internal space of a transport unit by performing functions comprising:
   detect a passage of a predetermined amount of time since at least one of a damper or blower corresponding to the CCU has been activated, which is an activation threshold condition;
   activate at least one of the damper or the blower to stir working fluid from within the CCU;
   detect a passage of a predetermined amount of time since at least one of the damper or the blower was activated, which is a de-activation threshold condition; and
   de-activate at least the activated damper or blower.

* * * * *